United States Patent
Tian

(10) Patent No.: US 12,058,002 B2
(45) Date of Patent: Aug. 6, 2024

(54) DEVICE CONFIGURATION METHOD, SYSTEM, AND APPARATUS

(71) Applicant: Huawei Technologies Co., Ltd., Shenzhen (CN)

(72) Inventor: Xu Tian, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 387 days.

(21) Appl. No.: 17/408,175

(22) Filed: Aug. 20, 2021

(65) Prior Publication Data

US 2021/0392045 A1 Dec. 16, 2021

Related U.S. Application Data

(63) Continuation of application No. PCT/CN2019/129313, filed on Dec. 27, 2019.

(30) Foreign Application Priority Data

Feb. 22, 2019 (CN) .......................... 201910133377.7

(51) Int. Cl.
| | | |
|---|---|---|
| *H04L 41/0866* | (2022.01) | |
| *H04L 41/0253* | (2022.01) | |
| *H04L 41/28* | (2022.01) | |

(52) U.S. Cl.
CPC ...... *H04L 41/0866* (2013.01); *H04L 41/0253* (2013.01); *H04L 41/28* (2013.01)

(58) Field of Classification Search
CPC ............ H04L 41/0866; H04L 41/0253; H04L 41/28; H04L 41/0806; H04L 63/0428; H04L 63/101; H04L 63/108; H04L 63/123; H04L 67/02; H04L 41/0803; H04L 63/0807

See application file for complete search history.

(56) References Cited

U.S. PATENT DOCUMENTS

| | | | | |
|---|---|---|---|---|
| 10,148,495 | B1 * | 12/2018 | Oczkowski | ............. H04W 8/20 |
| 2004/0073903 | A1 * | 4/2004 | Melchione | ................ G06F 8/60 |
| | | | | 717/172 |
| 2005/0232222 | A1 * | 10/2005 | McConnell | ............ H04L 12/66 |
| | | | | 370/352 |
| 2007/0011301 | A1 * | 1/2007 | Ong | .................... H04L 63/0823 |
| | | | | 709/224 |

(Continued)

FOREIGN PATENT DOCUMENTS

| | | |
|---|---|---|
| CN | 101621433 A | 1/2010 |
| CN | 103618769 A | 3/2014 |

(Continued)

*Primary Examiner* — Benjamin H Elliott, IV
(74) *Attorney, Agent, or Firm* — Conley Rose, P.C.

(57) ABSTRACT

A method includes generating verification information based on a to-be-configured device, where an association relationship exists between the verification information and service configuration information of the to-be-configured device; sending the verification information to the to-be-configured device; receiving a registration request from the to-be-configured device, where the registration request includes the verification information; and performing verification on the to-be-configured device based on the verification information, and sending the service configuration information of the to-be-configured device to the to-be-configured device.

16 Claims, 5 Drawing Sheets

(56) References Cited

U.S. PATENT DOCUMENTS

| | | | | |
|---|---|---|---|---|
| 2008/0263182 | A1* | 10/2008 | Ding | H04L 67/025 |
| | | | | 709/219 |
| 2010/0023603 | A1* | 1/2010 | Archer | H04L 67/303 |
| | | | | 709/225 |
| 2010/0027469 | A1* | 2/2010 | Gurajala | H04M 15/8038 |
| | | | | 370/328 |
| 2010/0188995 | A1* | 7/2010 | Raleigh | H04L 63/08 |
| | | | | 370/252 |
| 2011/0093595 | A1* | 4/2011 | Siripunkaw | H04L 41/046 |
| | | | | 709/225 |
| 2014/0206336 | A1* | 7/2014 | Li | H04W 64/003 |
| | | | | 455/419 |
| 2014/0273965 | A1* | 9/2014 | Raleigh | H04L 63/062 |
| | | | | 455/411 |
| 2015/0134967 | A1* | 5/2015 | Moore | H04L 63/083 |
| | | | | 713/168 |
| 2016/0134488 | A1* | 5/2016 | Straub | G06F 21/44 |
| | | | | 726/4 |
| 2016/0309001 | A1* | 10/2016 | Ramachandran | H04L 67/30 |
| 2017/0118167 | A1* | 4/2017 | Subramanya | H04L 63/101 |
| 2017/0118179 | A1* | 4/2017 | Onno | H04L 63/0478 |
| 2019/0116081 | A1* | 4/2019 | Gerodolle | H04L 61/2575 |
| 2019/0281455 | A1* | 9/2019 | Luo | H04W 12/08 |
| 2019/0373464 | A1* | 12/2019 | Chari | H04L 63/083 |
| 2020/0128392 | A1* | 4/2020 | Li | H04W 8/245 |
| 2021/0392045 | A1* | 12/2021 | Tian | H04L 41/0806 |
| 2022/0239560 | A1* | 7/2022 | Hao | H04L 41/0846 |

FOREIGN PATENT DOCUMENTS

| | | |
|---|---|---|
| CN | 104703182 A | 6/2015 |
| CN | 105635320 A | 6/2016 |
| CN | 105703938 A | 6/2016 |
| CN | 106311573 A | 1/2017 |
| CN | 106713471 A | 5/2017 |
| CN | 107181795 A | 9/2017 |
| CN | 107343285 A | 11/2017 |
| CN | 108347353 A | 7/2018 |
| CN | 108616521 A | 10/2018 |
| CN | 109218115 A | 1/2019 |
| DE | 202016008055 U1 | 2/2017 |
| EP | 2874369 A1 | 5/2015 |

* cited by examiner

DEVICE CONFIGURATION METHOD, SYSTEM, AND APPARATUS

CROSS-REFERENCE TO RELATED APPLICATIONS

This application is a continuation of international Application No. PCT/CN2019/129313, filed on Dec. 27, 2019, which claims priority to Chinese Patent Application No. 201910133377.7, filed on Feb. 22, 2019. The disclosures of the aforementioned applications are hereby incorporated by reference in their entireties.

TECHNICAL FIELD

This application relates to the field of communications technologies, and in particular, to a device configuration method, system, and apparatus.

BACKGROUND

Devices, such as routers or switches, usually are not configured (unconfigured) before delivery. When devices are unconfigured, a deployment engineer usually cooperates with a network administrator to power on the devices and perform initial configuration on the devices, to ensure that the devices can run properly and support specific service requirements. This process is a device configuration process or a device deployment process.

A commonly-used device configuration method includes: First, a network administrator performs service planning (for example, a quantity of devices located at a site, and services that are supported by each device) for a site by using a network management device, and the network management device generates, based on the service planning, service configuration information of devices located at each site. At this point, these devices have not gone online yet, and the service configuration information of these devices is stored on the network management device. Second, the network administrator obtains an equipment serial number (ESN) of a to-be-configured device at a site from a delivery person or a deployment engineer, and inputs the ESN of the to-be-configured device on the network management device, and the network management device establishes a correspondence between the ESN of the to-be-configured device and service configuration information of the to-be-configured device. Then, after the to-be-configured device is registered with the network management device, the network management device searches for the service configuration information of the to-be-configured device by using the ESN of the to-be-configured device, and delivers the found service configuration information to the to-be-configured device. Usually after the network administrator inputs the ESN of the to-be-configured device on the network management device, the network management device further needs to establish an association relationship between the ESN of the to-be-configured device and the site (for example, bind the to-be-configured device to the site). In this way, the network management device may learn of a correspondence between a site and service configuration information, to help the network administrator conveniently manage (for example, add, delete, or modify) the service configuration information based on the site.

In the foregoing device configuration method, an ESN of a device is bound to a site at which the device is located. Therefore, it is strictly required that a device with a specific ESN be delivered to a specific site, which raises high requirements on professional skills of a delivery person. Otherwise, services configured for a site may be incorrect. For example, it is assumed that a device 1 is located at a site 1, an ESN 1 of the device 1 is bound to the site 1, and an association relationship exists between the ESN 1 of the device 1 and configuration information of a service 1; and a device 2 is located at a site 2, an ESN 2 of the device 2 is bound to the site 2, and an association relationship exists between the ESN 2 of the device 2 and configuration information of a service 2. For example, the service 1 should be configured for the site 1 (to be specific, the service 1 should be configured for the device 1 that corresponds to the ESN 1 and that is located at the site 1), and the service 2 should be configured for the site 2 (to be specific, the service 2 should be configured for the device 2 that corresponds to the ESN 2 and that is located at the site 2). In this case, if the device 1 is delivered to the site 2 by mistake, during configuration of the device 1, the configuration information of the service 1 is found based on the ESN 1 of the device 1. As a result, a service configured for the site 2 is the service 1. Similarly, if the device 2 is delivered to the site 1 by mistake, a service configured for the site 1 is the service 2.

SUMMARY

Embodiments of this application provide a device configuration method, system, and apparatus. Before a to-be-configured device is registered, an ESN of the to-be-configured device is not bound to a site. Therefore, a device with a specific ESN does not need to be delivered to a specific site, which has a comparatively low requirement on professional skills of a delivery person, and can reduce labor costs and time costs required for delivery.

According to a first aspect, an embodiment of this application provides a device configuration method that is applied to a network management device. The method includes: generating verification information such as a token based on a to-be-configured device, where an association relationship exists between the verification information and service configuration information of the to-be-configured device; sending the verification information to the to-be-configured device; receiving a registration request from the to-be-configured device, where the registration request includes the verification information; and performing verification on the to-be-configured device based on the verification information, and sending the service configuration information to the to-be-configured device. In the technical solutions, the verification information is generated based on the to-be-configured device, and the association relationship exists between the verification information and the service configuration information of the to-be-configured device. Therefore, configuring, on a device located at a site, service configuration information corresponding to the site helps implement that a correct service is configured for the site. In the technical solutions, before registration, an ESN of the to-be-configured device is not bound to a site. Therefore, a device with a specific ESN does not need to be delivered to a specific site, which has a comparatively low requirement on professional skills of a delivery person, and can reduce labor costs and time costs required for delivery.

In a possible design, the sending the verification information to the to-be-configured device includes: sending a uniform resource locator (URL) link to an auxiliary configuration device (for example, a smartphone or a notebook computer), where a parameter of the URL link includes the verification information. A destination address in the URL link points to the to-be-configured device. Based on this, the auxiliary configuration device may send the parameter of the URL link to the to-be-configured device such that the to-be-configured device obtains the verification information and the to-be-configured information. In the technical solutions, the verification information and the to-be-configured information is transferred by using the URL link, and a deployment engineer can complete device configuration by performing only simple operations on a web page. This is simple and convenient, has a low requirement on professional skills of the deployment engineer, and can reduce labor costs and time costs required for device configuration.

In a possible design, the verification information has a period of validity. In this way, security of a registration process can be improved.

In a possible design, the registration request further includes an identifier of the to-be-configured device (for example, an ESN of the to-be-configured device), and the method further includes: performing trustlist verification on the to-be-configured device based on the identifier of the to-be-configured device. Correspondingly, the sending the service configuration information of the to-be-configured device to the to-be-configured device includes: sending the service configuration information of the to-be-configured device to the to-be-configured device after the to-be-configured device is successfully verified based on both the verification information of the to-be-configured device and the identifier of the to-be-configured device. In this way, security of the registration process can be improved.

In a possible design, the registration request further includes an identifier of the to-be-configured device (for example, an ESN of the to-be-configured device), the network management device stores an identifier of at least one site, and the at least one site includes a site at which the to-be-configured device is located; and the method further includes: establishing an association relationship between the identifier of the to-be-configured device and the identifier of the site at which the to-be-configured device is located. For example, after the trustlist verification is successfully performed on the to-be-configured device, an association relationship is established between the identifier of the to-be-configured device and the identifier of the site at which the to-be-configured device is located. In this way, it may be convenient for the network management device to manage devices (including the foregoing to-be-configured device), for example, adding identifiers of some devices to a blocklist based on a site.

In a possible design, the sending the verification information to the to-be-configured device includes: sending the verification information that is encrypted to the to-be-configured device. In this way, transmission security of the verification information can be improved.

According to a second aspect, an embodiment of this application provides a device configuration method that is applied to a to-be-configured device. The method includes: receiving verification information (for example, a token) from a network management device, where the verification information is generated by the network management device based on the to-be-configured device, an association relationship exists between the verification information and service configuration information of the to-be-configured device, and the verification information is used for registering the to-be-configured device with the network management device; sending a registration request to the network management device, where the registration request includes the verification information; and receiving the service configuration information sent by the network management device, and performing configuration based on the service configuration information.

In a possible design, the receiving verification information from a network management device includes: receiving a URL link sent by an auxiliary configuration device, where a parameter of the URL link includes the verification information (for example, the verification information of the to-be-configured device), and the URL link is from the network management device.

In a possible design, the parameter of the URL link further includes an address of the network management device and/or a management interface parameter of the to-be-configured device, and the management interface parameter is an address of the to-be-configured device or is used for obtaining the address of the to-be-configured device. The address of the network management device may be an IP address or a domain name of the network management device. The management interface parameter of the to-be-configured device may be a wide area network (WAN) interface parameter of the to-be-configured device, such as an Internet Protocol over Ethernet (IPoE) parameter, a Dynamic Host Configuration Protocol (DHCP) parameter, or a Point-To-Point Protocol over Ethernet (PPPoE) parameter. An IP address of a WAN interface may be obtained based on the DHCP parameter or the PPPoE parameter. A deployment engineer usually inputs (for example, through a command line) the address of the network management device and the management interface parameter of the to-be-configured device on the auxiliary configuration device. In this possible design, the address of the network management device and/or the management interface parameter of the to-be-configured device are/is transferred by using the URL link. This is simple and convenient, has a low requirement on professional skills of the deployment engineer, and can reduce labor costs and time costs required for device configuration.

In a possible design, the registration request further includes the address of the network management device and the address of the to-be-configured device.

In a possible design, the registration request further includes an identifier of the to-be-configured device (for example, an ESN of the to-be-configured device); and the identifier of the to-be-configured device is used by the network management device to perform trustlist verification on the to-be-configured device.

In a possible design, the received verification information is encrypted, and the method further includes: receiving a decryption key (for example, receiving a decryption key from the auxiliary configuration device), and decrypting the received verification information based on the decryption key.

For key terms and beneficial effects of the technical solutions provided in the second aspect or the related possible designs of the second aspect, refer to the key terms and beneficial effects of the technical solutions provided in the first aspect or the corresponding possible designs of the first aspect.

According to a third aspect, an embodiment of this application provides a device configuration system that includes a network management device and a to-be-configured device. The network management device is configured to generate verification information based on the to-be-configured device, and send the verification information to the to-be-configured device, where an association relationship exists between the verification information and service configuration information of the to-be-configured device.

The to-be-configured device is configured to send a registration request to the network management device, where the registration request includes the verification information. The network management device is further configured to perform verification on the to-be-configured device based on the verification information, and send the service configuration information to the to-be-configured device. The to-be-configured device is further configured to perform configuration based on the service configuration information.

In a possible design, the system further includes an auxiliary configuration device; and in an aspect of sending the verification information to the to-be-configured device, the network management device is further configured to send a URL link to the auxiliary configuration device; and correspondingly, the auxiliary configuration device is configured to send the URL link to the to-be-configured device, where a parameter of the URL link includes the verification information.

In a possible design, the parameter of the URL link further includes an address of the network management device and/or a management interface parameter of the to-be-configured device, and the management interface parameter is an address of the to-be-configured device or is used for obtaining the address of the to-be-configured device. Correspondingly, the registration request further includes the address of the network management device and the address of the to-be-configured device.

In a possible design, the parameter of the URL link is encrypted, where the auxiliary configuration device is further configured to send a decryption key to the to-be-configured device; and the to-be-configured device is further configured to decrypt the encrypted parameter of the URL link based on the decryption key.

In a possible design, the registration request further includes an identifier of the to-be-configured device (for example, an ESN of the to-be-configured device), where the network management device is further configured to perform trustlist verification on the to-be-configured device based on the identifier of the to-be-configured device; and correspondingly, the network management device is configured to send the service configuration information to the to-be-configured device after the to-be-configured device is successfully verified based on both the verification information and the identifier of the to-be-configured device.

In a possible design, the network management device stores an identifier of at least one site, and the at least one site includes a site at which the to-be-configured device is located, where the network management device is further configured to establish an association relationship between the identifier of the to-be-configured device and the identifier of the site at which the to-be-configured device is located after the trustlist verification is successfully performed on the to-be-configured device.

In a possible design, the verification information has a period of validity.

For key terms and beneficial effects of the technical solutions provided in the third aspect or the related possible designs of the third aspect, refer to the key terms and beneficial effects of the technical solutions provided in the first aspect or the second aspect, or the corresponding possible designs of the first aspect or the second aspect.

According to a fourth aspect, an embodiment of this application provides a device configuration apparatus configured to perform the device configuration method provided in any one of the first aspect or the possible designs of the first aspect. The device configuration apparatus may be further a network management device or a chip.

In a possible design, the device configuration apparatus includes modules configured to perform the device configuration method provided in any one of the first aspect or the possible designs of the first aspect.

In a possible design, the device configuration apparatus includes a memory and a processor, where the memory is configured to store a computer instruction, and when the device configuration apparatus runs, the processor executes the computer instruction in the memory to perform, by using a hardware resource in the device configuration apparatus, the operation steps of the device configuration method provided in any one of the first aspect or the possible designs of the first aspect.

In one example, the "sending" operation in any one of the first aspect or the possible designs of the first aspect may be understood as an output operation performed by the processor in the possible design. The "receiving" operation in any one of the first aspect or the possible designs of the first aspect may be understood as an input operation performed by the processor in the possible design.

In another example, the device configuration apparatus further includes a receiver and a sender, and the "sending" operation in any one of the first aspect or the possible designs of the first aspect may be understood as an operation performed by the sender under control of the processor in the possible design. The "receiving" operation in any one of the first aspect or the possible designs of the first aspect may be understood as an operation performed by the receiver under control of the processor in the possible design.

According to a fifth aspect, an embodiment of this application provides a device configuration apparatus configured to perform the device configuration method provided in any one of the second aspect or the possible designs of the second aspect. The device configuration apparatus may be further a to-be-configured device or a chip.

In a possible design, the device configuration apparatus includes modules configured to perform the device configuration method provided in any one of the second aspect or the possible designs of the second aspect.

In a possible design, the device configuration apparatus includes a memory and a processor, where the memory is configured to store a computer instruction, and when the device configuration apparatus runs, the processor executes the computer instruction in the memory to perform, by using a hardware resource in the device configuration apparatus, the operation steps of the device configuration method provided in any one of the second aspect or the possible designs of the second aspect.

In one example, the "sending" operation in any one of the second aspect or the possible designs of the second aspect may be understood as an output operation performed by the processor in the possible design. The "receiving" operation in any one of the second aspect or the possible designs of the second aspect may be understood as an input operation performed by the processor in the possible design.

In another example, the device configuration apparatus further includes a receiver and a sender, and the "sending" operation in any one of the second aspect or the possible designs of the second aspect may be understood as an operation performed by the sender under control of the processor in the possible design. The "receiving" operation in any one of the second aspect or the possible designs of the second aspect may be understood as an operation performed by the receiver under control of the processor in the possible design.

An embodiment of this application further provides a computer readable storage medium. The computer readable storage medium stores a computer program. When the computer program runs on a computer, the computer is enabled to perform the operation steps of the device configuration method provided in any one of the first aspect or the possible designs of the first aspect.

An embodiment of this application further provides a computer readable storage medium. The computer readable storage medium stores a computer program. When the computer program runs on a computer, the computer is enabled to perform the operation steps of the device configuration method provided in any one of the second aspect or the possible designs of the second aspect.

An embodiment of this application further provides a computer program product. When the computer program product runs on a computer, the computer is enabled to perform the operation steps of the device configuration method provided in any one of the first aspect or the possible designs of the first aspect.

An embodiment of this application further provides a computer program product. When the computer program product runs on a computer, the computer is enabled to perform the operation steps of the device configuration method provided in any one of the second aspect or the possible designs of the second aspect.

It may be understood that any one of the device configuration apparatuses, the computer readable storage medium, the computer program product, or the like provided above is configured to perform the corresponding method provided above. Therefore, for beneficial effects that can be achieved by the device configuration apparatus, the computer readable storage medium, the computer program product, or the like, refer to the beneficial effects in the corresponding method. Details are not described herein again.

DESCRIPTION OF EMBODIMENTS

In this application, "at least one" includes one or more. "Multiple" refers to two or more than two. For example, at least one of A, B, or C includes: Only A exists, only B exists, both A and B exist, both A and C exist, both B and C exist, and both A, B, and C exist. In description of this application, "I" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists.

Figure 1:
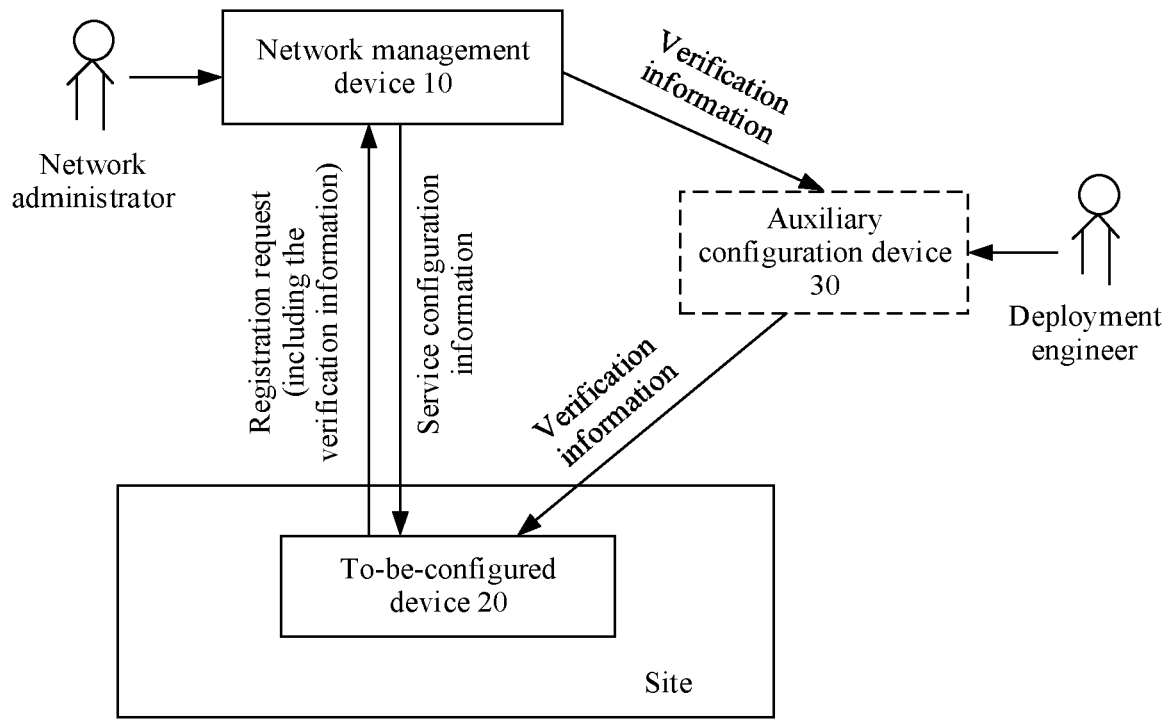
FIG. 1 is a schematic architectural diagram of a device configuration system according to an embodiment of this application.

FIG. 1 is a schematic architectural diagram of a device configuration system based on an embodiment of this application. The device configuration system includes a network management device 10 and at least one to-be-configured device 20. In FIG. 1, an example in which the device configuration system includes one to-be-configured device 20 is used for description. Optionally, the device configuration system may further include an auxiliary configuration device 30. In the device configuration system:

The network management device 10 is configured to manage an association relationship between a site and the to-be-configured device 20, service configuration information of the to-be-configured device 20, and the like. In addition, the network management device 10 may be further configured to generate verification information such as a token.

The service configuration information of the to-be-configured device 20 is information that needs to be configured when the to-be-configured device 20 supports one (type of) service or a plurality of (types of) services. The service may be a broadband service, an Internet Protocol television (IPTV) service, or the like. The verification information is information used when verification is performed on the to-be-configured device 20 in a process in which the to-be-configured device 20 is registered with the network management device 10. The site is a physical location in which the to-be-configured device 20 is located, for example, a room number of a building in a community. The network management device 10 may manage one or more sites, and one or more to-be-configured devices 20 may be deployed at each site. In addition, for ease of description, a concept of "configuring a service for a site" is introduced in the embodiments of this application, and further refers to configuring a service for a device located at the site. A unified description is provided herein, and details are not described again in the following.

The to-be-configured device 20 is customer premises equipment (CPE) that is unconfigured and that has a configuration requirement, for example, a router or a switch. The network management device 10 can send the service configuration information to the to-be-configured device 20 only after the to-be-configured device 20 is registered with the network management device 10. A process of registering the to-be-configured device 20 with the network management device 10 may include: The to-be-configured device 20 sends a registration request that includes the verification information to the network management device 10, and the network management device 10 performs verification on the to-be-configured device 20 based on the verification information. If the verification succeeds, it indicates that the registration succeeds.

The auxiliary configuration device 30 may be configured to establish a connection path between the network management device 10 and the to-be-configured device 20 such that the network management device 10 can send, to the to-be-configured device 20, information (such as the verification information, an address of the network management device 10, and/or a management interface parameter of the to-be-configured device 20) required in the registration process. In addition, the auxiliary configuration device 30 may further send, to the to-be-configured device 20, information (for example, a decryption key in the following) input by a deployment engineer. The auxiliary configuration device 30 may be a device that has a function of connecting to the to-be-configured device 20 and has a function of receiving information input by a user (for example, including an input apparatus such as a keyboard or a mouse), such as a smartphone, a tablet computer, a notebook computer, or a desktop computer.

The auxiliary configuration device 30 may be connected to the to-be-configured device 20 in a wired manner, for example, by using a network cable or a universal serial bus (USB) cable, or may be connected to the to-be-configured device 20 in a wireless manner, for example, by using Wi-Fi® or Bluetooth®.

It may be understood that, if a to-be-configured device 20 can be directly connected to the network management device 10 and has a function of receiving information input by a user, the device configuration system may not include the auxiliary configuration device 30.

Concepts such as "network administrator", "delivery person", and "deployment engineer" are further introduced in this application. Details are provided in the following.

A network administrator is a user who inputs information into the network management device 10. The information may be service planning information (for example, a quantity of devices located at a site, and services that are supported by each device), a period of validity of verification information, and the like.

A delivery person is a user who delivers the to-be-configured device 20 to a site.

A deployment engineer can also be an onsite installation engineer or onsite deployment engineer. If the device configuration system includes the auxiliary configuration device 30, the deployment engineer may be responsible for installing the to-be-configured device 20 on site, powering on the to-be-configured device 20, connecting the to-be-configured device 20 to the auxiliary configuration device 30, and the like. In addition, the deployment engineer may be further responsible for inputting information, for example, a decryption key, into the auxiliary configuration device 30. If the device configuration system does not include the auxiliary configuration device 30, the deployment engineer may be responsible for installing the to-be-configured device 20 on site, powering on the to-be-configured device 20, inputting information, such as a decryption key, into the to-be-configured device 20, and the like.

The device configuration system shown in FIG. 1 is merely an example of a system applicable to the technical solutions provided in the embodiments of this application, and does not constitute a limitation on the system applicable to the technical solutions provided in the embodiments of this application. In addition, for steps performed by each device (for example, the network management device 10, the to-be-configured device 20, and the auxiliary configuration device 30) in FIG. 1, refer to the following method embodiments, and details are not described herein.

Figure 2:
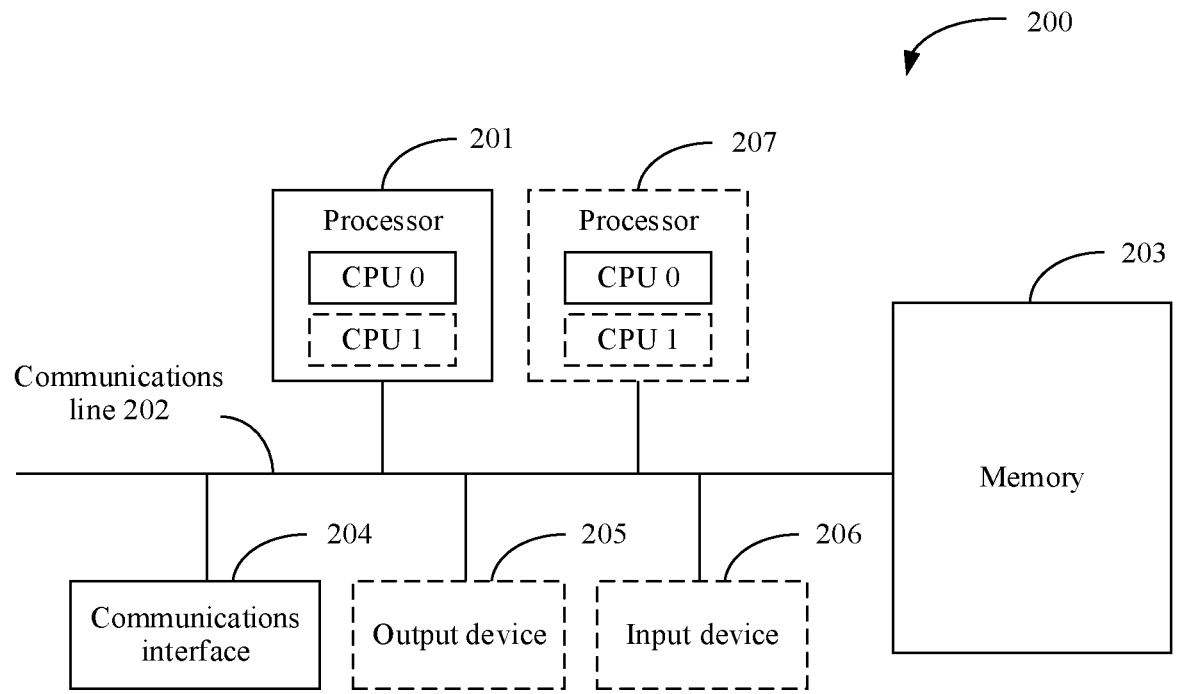
FIG. 2 is a schematic diagram of a hardware structure of a communications device according to an embodiment of this application.

Each device (for example, the network management device 10, the to-be-configured device 20, and the auxiliary configuration device 30) in FIG. 1 may be implemented by using a communications device 200 in FIG. 2. The communications device 200 includes at least one processor 201, a communications line 202, a memory 203, and at least one communications interface 204.

The processor 201 may be a general-purpose central processing unit (CPU), a microprocessor, an application-specific integrated circuit (ASIC), or one or more integrated circuits configured to control program execution in the solutions of this application.

The communications line 202 may include a path for transferring information between the foregoing components (for example, the at least one processor 201, the communications line 202, the memory 203, and the at least one communications interface 204).

The communications interface 204 uses any apparatus such as a transceiver, and is configured to communicate with another device or a communications network, such as a wide area network (WAN) or a local area network (LAN).

The memory 203 may be a read-only memory (ROM) or another type of static storage device capable of storing static information and an instruction, or a random-access memory (RAM) or another type of dynamic storage device capable of storing information and an instruction. The memory 203 may also be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray® disc, and the like), a magnetic disk storage medium or another magnetic storage device, or any other medium capable of carrying or storing expected program code in a form of an instruction or a data structure and capable of being accessed by a computer, but is not limited thereto. The memory 203 may exist independently, and is connected to the processor 201 by using the communications line 202. The memory 203 may In an example be integrated with the processor 201. The memory 203 provided in this embodiment of this application may usually be non-volatile. The memory 203 is configured to store a computer instruction for executing the solutions of this application, and the execution is controlled by the processor 201. The processor 201 is configured to execute the computer instruction stored in the memory 203, to implement the method provided in the following embodiments of this application.

Optionally, the computer instruction in this embodiment of this application may also be application program code. This is not limited in this embodiment of this application.

In an implementation, in an embodiment, the communications device 200 may include a plurality of processors, for example, the processor 201 and a processor 207 in FIG. 2. Each of these processors may be a single-core (single-CPU) processor, or may be a multi-core (multi-CPU) processor. The processor herein may be one or more devices, circuits, and/or processing cores configured to process data (for example, a computer program instruction).

In an implementation, in an embodiment, the communications device 200 may further include an output device 205 and/or an input device 206. The output device 205 communicates with the processor 201, and may display information in a plurality of manners. For example, the output device 205 may be a liquid crystal display (LCD), a light-emitting diode (LED) display device, a cathode-ray tube (CRT) display device, or a projector. The input device 206 communicates with the processor 201, and may receive, in a plurality of manners, input from a user. For example, the input device 206 may be a mouse, a keyboard, a touchscreen device, or a sensing device.

Figure 3:
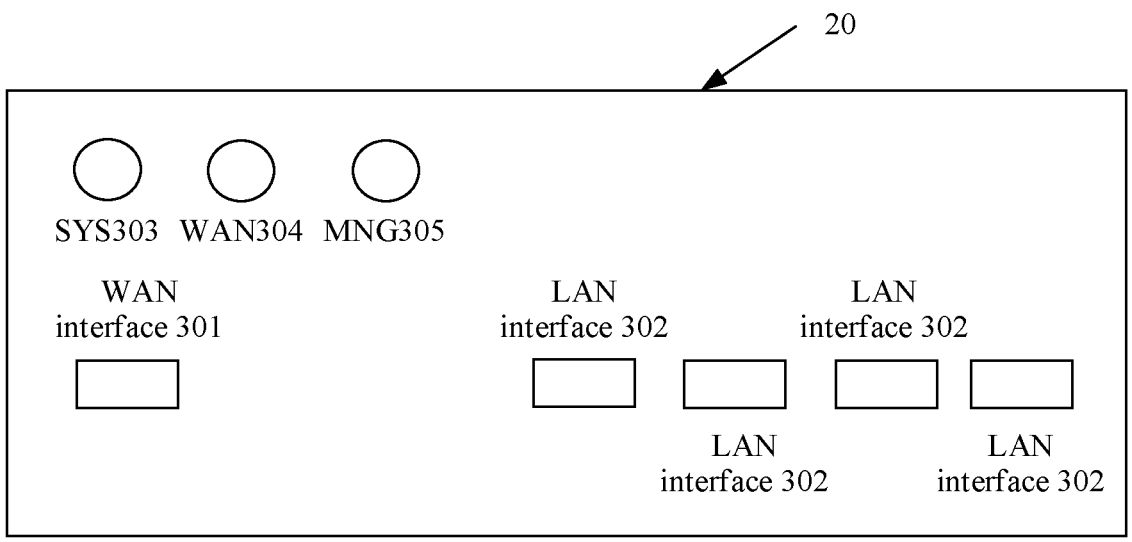
FIG. 3 is a schematic diagram of a product form of a to-be-configured device according to an embodiment of this application.

FIG. 3 is a schematic diagram of a product form of a to-be-configured device 20 based on an embodiment of this application. The to-be-configured device 20 shown in FIG. 3 includes a WAN interface 301, at least one LAN interface 302, and indicators "SYS" 303, "WAN" 304, and "MNG" 305. In the to-be-configured device 20:

In an example, with reference to FIG. 2, the WAN interface 301 and the LAN interface 302 may be considered as implementations of the communications interface 204. The indicators "SYS" 303, "WAN" 304, and "MNG" 305 may be considered as implementations of the output device 205. A deployment engineer may learn of a running status of the to-be-configured device 20 through these indicators. One or more of these indicators are optional.

The WAN interface 301 is an interface configured to enable the to-be-configured device 20 to connect to a WAN network such as an internet network. A connection manner used for connecting to the WAN network is, for example but is not limited to, an Internet Protocol (IP) manner, a DHCP manner, or a PPPoE manner. The WAN interface 301 may be used as a management interface of the to-be-configured device 20, for example, an interface connecting the to-be-configured device 20 and a network management device 10.

The LAN interface 302 is an interface configured to enable the to-be-configured device 20 to connect to a LAN network. In an example, an IP address (for example, 192.168.0.1) of one LAN interface 302 of the to-be-configured device 20 is predefined before the to-be-configured device 20 is delivered, and may be used for connecting to an auxiliary configuration device 30. Another LAN interface 302 may be configured to connect to another device such as a switch.

The indicator "SYS" 303 is configured to indicate whether the to-be-configured device 20 is in a normal system status.

The indicator "WAN" 304 is configured to indicate whether the WAN interface 301 is successfully connected to a WAN network, for example, whether an IP address of the WAN interface 301 is obtained.

The indicator "MNG" 305 is a management indicator, and is configured to indicate whether the to-be-configured device 20 is successfully connected to the network management device 10, for example, configured to indicate whether the to-be-configured device 20 is successfully registered with the network management device 10.

With reference to the accompanying drawings, the following describes a device configuration method provided in an embodiment of this application.

Figure 4A:
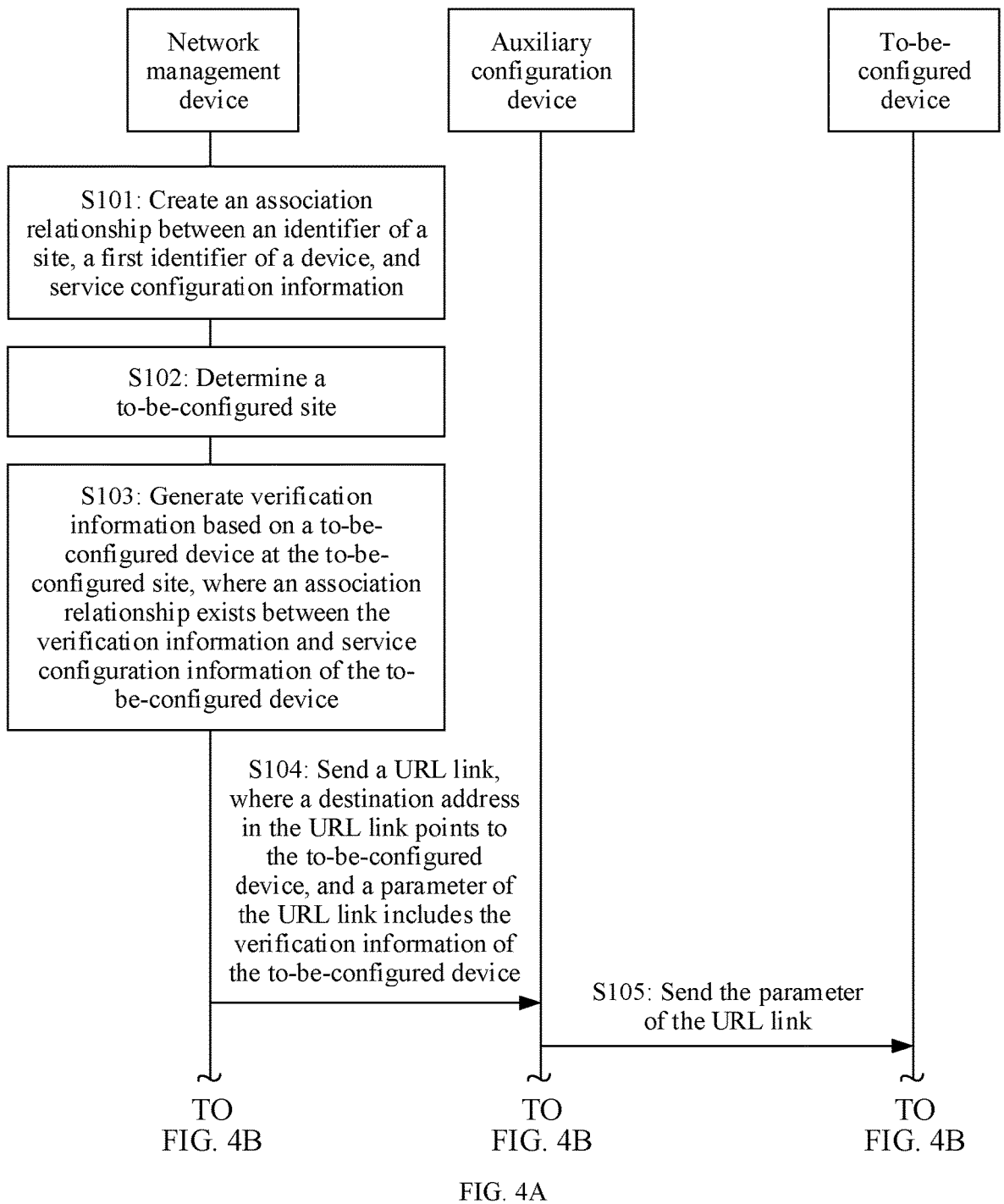
FIG. 4A is a schematic interaction diagram of a device configuration method according to an embodiment of this application.
Figure 4B:
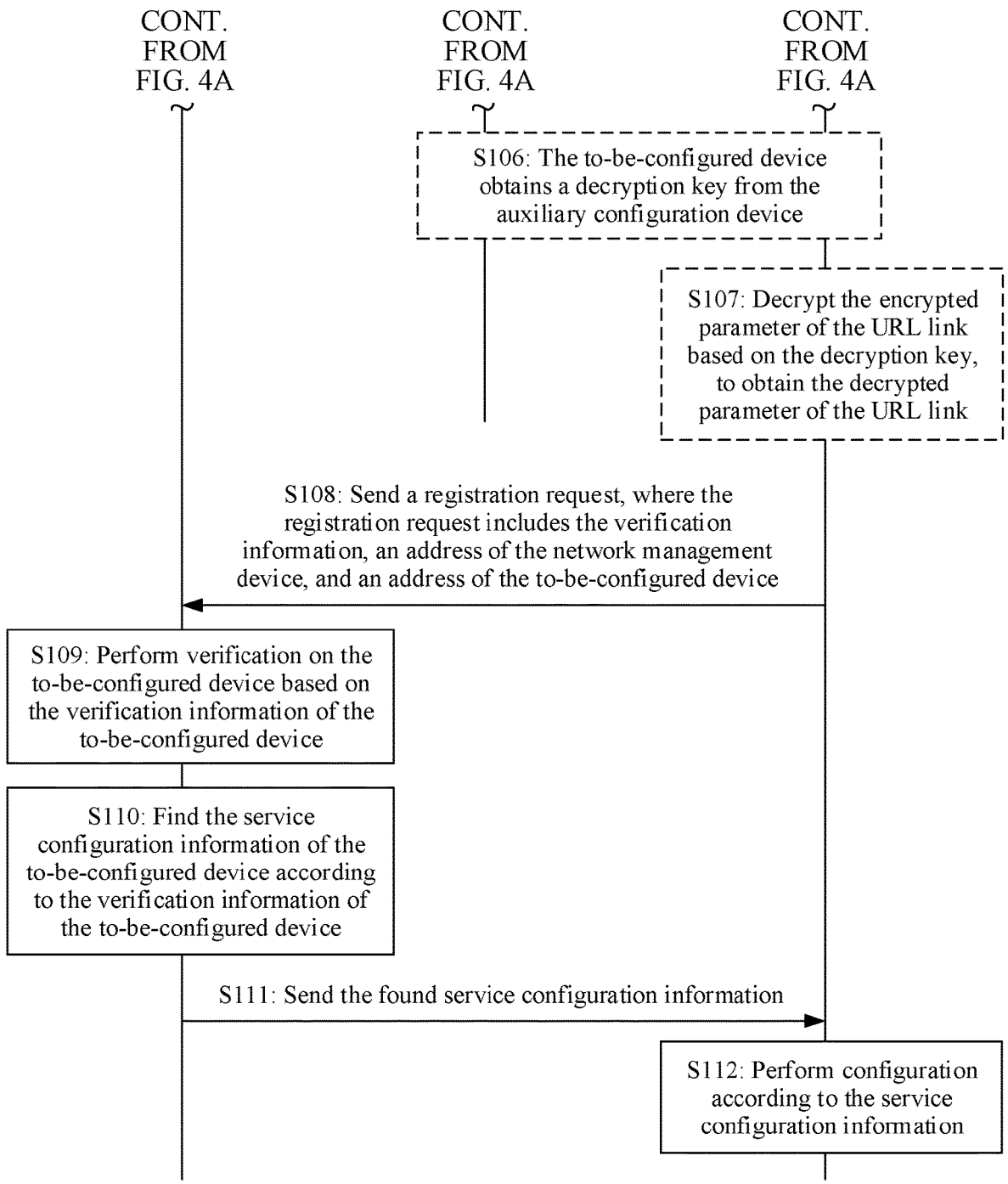
FIG. 4B is a schematic interaction diagram of a device configuration method according to an embodiment of this application.

FIG. 4A and FIG. 4B are schematic interaction diagrams of a device configuration method based on an embodiment of this application. The method includes the following steps.

S101: A network management device creates an association relationship between an identifier of a site, a first identifier of a device, and service configuration information. The device herein is an unconfigured device.

The identifier of a site may be a name of the site, and the like, such as a room number of a building in a community.

The first identifier of a device may be an identifier such as a name of the device, and is used by a network administrator to view or manage information about the device. For example, the first identifier of a device may be an identifier defined by the network administrator, for example, an identifier that is defined based on one or more of physical locations of the devices, information about an operator to which a service provisioned for the device belongs, and bandwidth information of a service provisioned for the device. For example, the first identifier of a device may be "a telecommunications device (for example, a device for which a telecommunications service is provisioned) in room 101 on the third floor". It should be noted that a concept of the "first identifier of a device" is proposed in this embodiment of this application to distinguish between the "first identifier of a device" and a "second identifier of a device" in the following. The second identifier of a device is an identifier predefined when the device is delivered, for example, an ESN of the device.

In an implementation, the network administrator may input, into the network management device, service planning information of a site managed by the network management device, for example, a quantity of devices located at a site, a first identifier of each device, and services supported by each device. Then, the network management device generates service configuration information of devices located at each site based on the service planning information. At this point, these devices have not gone online yet, and the service configuration information of these devices is stored on the network management device.

An example of the association relationship, created by the network management device, between an identifier of a site, a first identifier of a device, and service configuration information may be shown in Table 1.

TABLE 1

| Identifier of a site | First identifier of a device | Service configuration information |
|---|---|---|
| Site 1 | Device 1 | Service configuration information 1 |
| Site 2 | Device 2 | Service configuration information 2 |
| Site 3 | Device 3 | Service configuration information 3 |
|  | Device 4 | Service configuration information 4 |

Table 1 may be understood as follows: The network administrator plans to deploy one device at each of the site 1 and the site 2, and service configuration information of the two devices is the service configuration information 1 and the service configuration information 2 separately; and the network administrator plans to deploy two devices at the site 3, and service configuration information of the two devices is the service configuration information 3 and the service configuration information 4 separately.

S102: The network management device determines a to-be-configured site (for example, a site that has a configuration requirement). For example, it may be any one of the sites in Table 1. Further, the network administrator may learn of the to-be-configured site from a delivery person or an onsite installation person.

S103: The network management device generates verification information based on a to-be-configured device at the to-be-configured site, where an association relationship exists between the verification information and service configuration information of the to-be-configured device.

The verification information may be any form of information that can be used for performing verification on the to-be-configured device. For example, the verification information may be a character or a character string. Optionally, the verification information is a token. In computer identity authentication, the token refers to a token, is generally used in invitation or system login, and may be an invitation code, a verification code, or the like.

It may be understood that, when S103 is performed, the network management device has not learned of a second identifier of the to-be-configured device (for example, an ESN of the to-be-configured device), but has created a first identifier of the to-be-configured device. In this case, the network management device may generate the verification information based on the first identifier of the to-be-configured device.

In S103, the network management device generates the verification information by using a to-be-configured device as a granularity. Further, if there are N devices located at the to-be-configured site, the network management device generates N pieces of verification information. The verification information is in a one-to-one correspondence with the device at the to-be-configured site. N is an integer greater than or equal to 1.

Optionally, the verification information has a period of validity. The period of validity of the verification information may be a default value, or may be a value input by the network administrator into the network management device. The period of validity of the verification information may be a period of time starting from a moment at which the network management device generates the verification information. If the period of validity of the verification information is exceeded, the verification information becomes invalid. In this case, the network management device needs to regenerate verification information, and then continues to perform the following S104. In this way, security of a registration process can be improved. Based on this, in an implementation, the network management device may record a time at which the network management device generates the verification information.

For example, assuming that each device in Table 1 is a to-be-configured device, after S103 is performed, information stored in the network management device may be shown in Table 2.

TABLE 2

| Identifier of a site | First identifier of a device | Verification information (such as a token) | Generation time of verification information | Service configuration information |
|---|---|---|---|---|
| Site 1 | Device 1 | WERJLAWER | 20181112120000 | Service configuration information 1 |
| Site 2 | Device 2 | DFASFDAF3 | 20181112120000 | Service configuration information 2 |
| Site 3 | Device 3 | 123124DF3 | 20181112131234 | Service configuration information 3 |
|  | Device 4 | DGRTERWER | 20181112131234 | Service configuration information 4 |

S104: The network management device sends a URL link to an auxiliary configuration device. A destination address in the URL link points to the to-be-configured device (for example, the destination address may be 192.168.0.1). A parameter of the URL link includes the verification information of the to-be-configured device (for example, the verification information generated in S103).

For example, the network management device sends the URL link to the auxiliary configuration device by using an email. In addition, the network management device may also send the URL link to the auxiliary configuration device in another manner, for example, send the URL link by using an instant messaging tool (such as a short message or WeChat) installed in the auxiliary configuration device. For another example, the URL link is sent by using an application (App) installed in the auxiliary configuration device.

Optionally, the parameter of the URL link may further include an address of the network management device and/or a management interface parameter of the to-be-configured device. The address of the network management device may be an IP address or a domain name of the network management device. The management interface parameter of the to-be-configured device may be a WAN interface parameter of the to-be-configured device, for example, may be an IPoE parameter (for example, including an IP address of a management interface, namely, a WAN interface, that is of the to-be-configured device and that is used to connect to the network management device), a DHCP parameter, or a PPPoE parameter (for example, including a username and a password). The IP address of the WAN interface may be obtained based on the DHCP parameter or the PPPoE parameter. In an example, the address of the network management device and/or the management interface parameter of the to-be-configured device may be input into the auxiliary configuration device by a deployment engineer, for example, input into the auxiliary configuration device in a command line manner, and then is sent to the to-be-configured device by the auxiliary configuration device.

Optionally, the parameter of the URL link may be encrypted, or may be not encrypted. An advantage of encryption is that the auxiliary configuration device cannot obtain the verification information, which provides further security.

S105: The auxiliary configuration device sends the parameter of the URL link to the to-be-configured device.

Further, the deployment engineer installs and powers on the to-be-configured device, and connects the auxiliary configuration device and the to-be-configured device. Then, after the URL link is clicked, the auxiliary configuration device sends a Hypertext Transfer Protocol (HTTP) request to the to-be-configured device based on the URL link. Web server software may be built in the to-be-configured device to parse the HTTP request, for example, to parse out which field of the HTTP request carries which parameter of the URL link, to obtain content of the HTTP request, for example, the parameter of the URL link.

In some embodiments, the network management device may send installation operation information to the auxiliary configuration device, to instruct the deployment engineer to install and power on the to-be-configured device, connect the to-be-configured device to the auxiliary configuration device, and the like. In an example, the network management device may send the installation operation information and the URL link together as mail content to the auxiliary configuration device.

Optionally, if there is a plurality of devices located at the to-be-configured site, the network management device may send a plurality of URL links to the auxiliary configuration device, where the URL links are in a one-to-one correspondence with the devices. The network management device may further send operator information, bandwidth information, or the like that corresponds to each URL link to the auxiliary configuration device such that the deployment engineer may install the to-be-configured device based on the information, and select and click one of the plurality of URL links, to enable the auxiliary configuration device to perform S105.

For example, it is assumed that devices located at the to-be-configured site include a device A and a device B, a service of a "telecom" operator is provisioned for one of the two devices, and a service of a "mobile" operator is provisioned for the other device. In this case, the network management device may send the following information to the auxiliary configuration device: ["telecom" operator, URL link 1] and ["mobile" operator, URL link 2]. In other words, a parameter of the URL link 1 is related to "telecom", and a parameter of the URL link 2 is related to "mobile". The deployment engineer may connect the device A to a telecommunications network interface and click the URL link 1 such that the auxiliary configuration device sends the parameter of the URL link 1 to the device A. Similarly, the deployment engineer may connect the device B to a mobile network interface and click the URL link 2 such that the auxiliary configuration device sends the parameter of the URL link 2 to the device B.

S104 to S105 are an implementation in which the network management device sends the verification information of the to-be-configured device to the to-be-configured device. This embodiment of this application is not limited thereto. For example, if the to-be-configured device may directly communicate with the network management device, the network management device may directly send the verification information of the to-be-configured device to the to-be-configured device, and does not need forwarding performed by the auxiliary configuration device. For another example, a USB flash drive may be inserted into the auxiliary configuration device to import the verification information of the to-beconfigured device, and then the auxiliary configuration device sends the imported verification information to the to-be-configured device.

If the parameter of the URL link is encrypted, S106 to S112 are performed. If the parameter of the URL link is not encrypted, S108 to S112 are performed. Whether the parameter of the URL link is encrypted may be predefined, or may be indicated by the network management device by sending information to the to-be-configured device (for example, sending the information to the to-be-configured device by using auxiliary configuration device). This is not limited in this embodiment of this application.

S106: The to-be-configured device obtains a decryption key from the auxiliary configuration device.

For example, the to-be-configured device pushes a portal (entry) page to the auxiliary configuration device, and the deployment engineer may input a decryption key on the portal page. After detecting the decryption key input by the deployment engineer, the auxiliary configuration device sends the decryption key to the to-be-configured device.

S107: The to-be-configured device decrypts the encrypted parameter of the URL link based on the decryption key, to obtain the decrypted parameter of the URL link.

A decryption algorithm used when the to-be-configured device performs decryption may be predefined, or may be indicated by the network management device by sending information to the to-be-configured device (for example, sending the information to the to-be-configured device by using auxiliary configuration device). This is not limited in this embodiment of this application. The decryption algorithm used by the to-be-configured device is corresponding to an encryption algorithm that is used when the network management device encrypts the parameter of the URL link.

S108: The to-be-configured device sends a registration request to the network management device, where the registration request includes the verification information of the to-be-configured device (for example, the verification information generated in S103), and may further include the address of the network management device and an address of the to-be-configured device. The verification information included in the registration request may be not encrypted. This is not limited in this embodiment of this application. In the registration request, the address of the network management device is a destination address, and the address of the to-be-configured device (for example, the IP address of the WAN interface) is a source address.

Optionally, the registration request further includes the second identifier of the to-be-configured device, for example, the ESN of the to-be-configured device.

S109: The network management device performs verification on the to-be-configured device based on the verification information of the to-be-configured device. If the verification is successful, it indicates that the to-be-configured device is successfully registered with the network management device.

For example, the network management device may determine whether the verification information of the to-be-configured device that is included in the registration request is the same as the verification information of the to-be-configured device (for example, the verification information generated in S103) that is stored in the network management device. If they are the same, the verification is successful. If they are not the same, the verification fails. Optionally, if the verification fails, the network management device may return to perform S103, for example, regenerate verification information of the to-be-configured device.

Optionally, if the registration request further includes an identifier of the to-be-configured device (for example, the ESN of the to-be-configured device), the network management device may perform trustlist verification on the to-be-configured device based on the identifier of the to-be-configured device. Based on this, S109 may include: sending the service configuration information of the to-be-configured device to the to-be-configured device after the to-be-configured device is successfully verified based on both the verification information of the to-be-configured device and the identifier of the to-be-configured device. A trustlist is a set of ESNs of devices supported by the network management device. If the ESN of the to-be-configured device is in the trustlist, the trustlist verification is successful. If the ESN of the to-be-configured device is not in the trustlist, the trustlist verification fails. In this case, the to-be-configured device cannot be registered with the network management device. In this way, security of the registration process can further be improved.

S110: The network management device finds the service configuration information of the to-be-configured device based on the verification information of the to-be-configured device.

For example, based on Table 2, assuming that the verification information of the to-be-configured device is DFASFDAF3, the service configuration information of the to-be-configured device is the service configuration information 2.

S111: The network management device sends the found service configuration information to the to-be-configured device.

S112: The to-be-configured device performs configuration based on the service configuration information.

After S112 is performed, the to-be-configured device can run properly and support a service requirement. For a configuration process, refer to other approaches. Details are not described herein. Subsequently, the to-be-configured device may send information to the auxiliary configuration device such that a portal page displays a prompt message indicating that the configuration succeeds or fails. In an example, the deployment engineer can determine whether the configuration is successful based on an indicator on the to-be-configured device (as shown in FIG. 3). Certainly, this embodiment of this application is not limited thereto.

In the technical solutions provided in the embodiments of this application, service configuration information corresponding to a site is configured on a device located at the site, which helps implement that a correct service is configured for the site. In the technical solutions, before registration, an ESN of a to-be-configured device is not bound to a site. Therefore, a device with a specific ESN does not need to be delivered to a specific site, which has a comparatively low requirement on professional skills of a delivery person, and can reduce labor costs and time costs required for delivery. In addition, in a process of configuring the to-be-configured device, the ESN of the to-be-configured device does not need to be used. Therefore, a network administrator does not need to input the ESN of the to-be-configured device into a network management device. However, in other approaches, an ESN of a to-be-configured device needs to be used for verification; and in addition, the ESN is usually manually input into a network management device by a network administrator, and manual input is prone to errors.

In the following, examples are used to describe that the technical solutions provided in the embodiments of this application can resolve a problem in other approaches that a service configured for a site is incorrect due to a delivery error.

Example 1: It is assumed that an ESN of a device delivered to a site 1 is "E1111111111", an ESN of a device delivered to a site 2 is "E2222222222", and ESNs of devices delivered to a site 3 are "E3333333333" and "E4444444444" separately. In this case, based on Table 2, after registration is completed, information stored in a network management device may be shown in Table 3.

TABLE 3

| Identifier of a site | First identifier of a device | Second identifier of a device (such as an ESN) | Verification information (such as a token) | Generation time of verification information | Service configuration information |
|---|---|---|---|---|---|
| Site 1 | Device 1 | E1111111111 | WERJLAWER | 20181112120000 | Service configuration information 1 |
| Site 2 | Device 2 | E2222222222 | DFASFDAF3 | 20181112120000 | Service configuration information 2 |
| Site 3 | Device 3 | E3333333333 | 123124DF3 | 20181112131234 | Service configuration information 3 |
|  | Device 4 | E4444444444 | DGRTERWER | 20181112131234 | Service configuration information 4 |

It may be understood that, the ESN of the device 3 shown in Table 3 may be replaced with E4444444444, and correspondingly, the ESN of the device 4 shown in Table 3 is replaced with E3333333333, to obtain a new table.

Example 2: It is assumed that an ESN of a device delivered to a site 1 is "E2222222222", an ESN of a device delivered to a site 2 is "E1111111111", and ESNs of devices delivered to a site 3 are "E3333333333" and "E4444444444" separately. In this case, based on Table 2, after registration is completed, information stored in a network management device may be shown in Table 4.

TABLE 4

| Identifier of a site | First identifier of a device | Second identifier of a device (such as an ESN) | Verification information (such as a token) | Generation time of verification information | Service configuration information |
|---|---|---|---|---|---|
| Site 1 | Device 1 | E2222222222 | WERJLAWER | 20181112120000 | Service configuration information 1 |
| Site 2 | Device 2 | E1111111111 | DFASFDAF3 | 20181112120000 | Service configuration information 2 |
| Site 3 | Device 3 | E3333333333 | 123124DF3 | 20181112131234 | Service configuration information 3 |
|  | Device 4 | E4444444444 | DGRTERWER | 20181112131234 | Service configuration information 4 |

It may be understood that, the ESN of the device 3 shown in Table 4 may be replaced with E4444444444, and correspondingly, the ESN of the device 4 shown in Table 4 is replaced with E3333333333, to obtain a new table.

By comparing Table 3 and Table 4, it can be learned that, if the devices identified by "E1111111111" and "E2222222222" are of a same model, no matter which one of the two devices is delivered to the site 1 and which one of the two devices is delivered to the site 2, it can be ensured that service configuration information configured for the site 1 is the service configuration information 1, and service configuration information configured for the site 2 is the service configuration information 2. In other words, services configured for the site 1 and the site 2 are not affected. Therefore, compared with the technical solutions in other approaches in which a device with a specific ESN must be strictly delivered to a specific site, the technical solutions provided in the embodiments of this application can resolve the problem in other approaches that a service configured for a site is incorrect due to a delivery error.

It should be noted that to-be-configured devices of different types (or models) have different performance parameters (for example, an interface type or a processing rate of a memory or processor). Therefore, on a basis that an ESN of a to-be-configured device is not bound to a site, to ensure that performance of the to-be-configured device is performance expected by a user, the embodiments of this application support a technical solution in which a site is bound to a device type (or model). Based on this, during delivery to a specific site, a delivery person only needs to deliver a device that meets a device type requirement and that is of the specific site, which helps implement that a correct service is configured for the site.

Optionally, if the registration request further includes an identifier of the to-be-configured device (for example, the ESN of the to-be-configured device), the network management device may establish an association relationship between the to-be-configured device and a site at which the to-be-configured device is located, for example, bind the to-be-configured device to the site. In this way, it may be convenient for the network management device to manage devices, for example, adding identifiers of some devices to a blocklist based on a site.

The foregoing mainly describes the solutions provided in the embodiments of this application from a perspective of a method. To implement the foregoing functions, corresponding hardware structures and/or software modules for performing the functions are included in the solutions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional module division may be performed for a network management device and a to-be-configured device based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in this embodiment of this application, module division is exemplary, and is merely a logical function division. In actual implementation, another division manner may be used.

Figure 5:
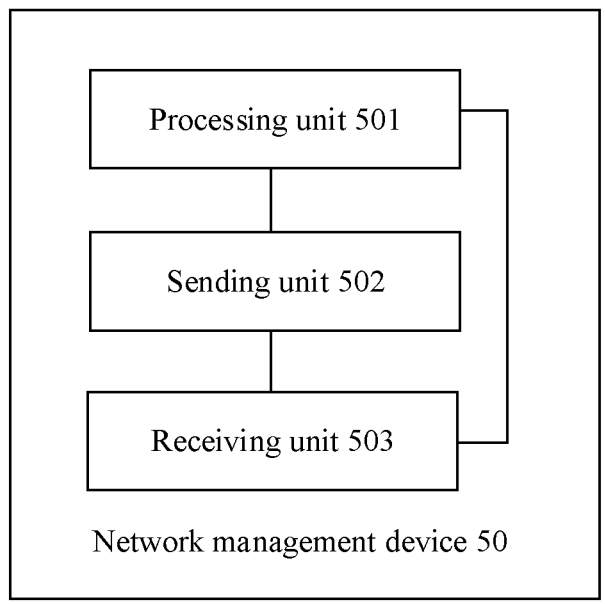
FIG. 5 is a schematic structural diagram of a network management device according to an embodiment of this application.

FIG. 5 is a schematic structural diagram of a network management device 50 based on an embodiment of this application. In an example, the network management device 50 may be configured to perform the steps performed by the network management device in the device configuration method shown in FIG. 4A and FIG. 4B. The network management device 50 may include a processing unit 501, a sending unit 502, and a receiving unit 503.

The processing unit 501 is configured to generate verification information based on a to-be-configured device, where an association relationship exists between the verification information and service configuration information of the to-be-configured device. The sending unit 502 is configured to send the verification information to the to-be-configured device. The receiving unit 503 is configured to receive a registration request from the to-be-configured device, where the registration request includes the verification information. The processing unit 501 is further configured to perform verification on the to-be-configured device based on the verification information. The sending unit 502 is further configured to send the service configuration information to the to-be-configured device. For example, with reference to FIG. 4A and FIG. 4B, the processing unit 501 may be configured to perform S103 and S109, the sending unit 502 may be configured to perform S104 and S111, and the receiving unit 503 may be configured to perform a receiving step corresponding to S108.

Optionally, the sending unit 502 is further configured to send a URL link to an auxiliary configuration device, where a parameter of the URL link includes the verification information. For example, with reference to FIG. 4A and FIG. 4B, the sending unit 502 may be configured to perform S104.

Optionally, the verification information has a period of validity.

Optionally, the registration request further includes an identifier of the to-be-configured device. Correspondingly, the processing unit 501 is further configured to perform trustlist verification on the to-be-configured device based on the identifier of the to-be-configured device (for example, an ESN of the to-be-configured device). The sending unit 502 is configured to send the service configuration information to the to-be-configured device after the to-be-configured device is successfully verified based on both the verification information and the identifier of the to-be-configured device.

Optionally, the network management device 50 stores an identifier of at least one site, and the at least one site includes a site at which the to-be-configured device is located. The processing unit 501 is further configured to establish an association relationship between the identifier of the to-be-configured device (for example, the ESN of the to-be-configured device) and an identifier of the site at which the to-be-configured device is located after the trustlist verification is successfully performed on the to-be-configured device.

Optionally, the sending unit 502 is further configured to send the verification information that is encrypted to the to-be-configured device.

For explanations of related content, descriptions of beneficial effects, and the like of any network management device 50 provided above, refer to the foregoing corresponding method embodiments. Details are not described herein again.

In an example, with reference to the communications device shown in FIG. 2, the processing unit 501 may be implemented by using the processor 201 or the processor 207 in FIG. 2. The sending unit 502 and the receiving unit 503 may be implemented by using the communications interface 204 in FIG. 2.

Figure 6:
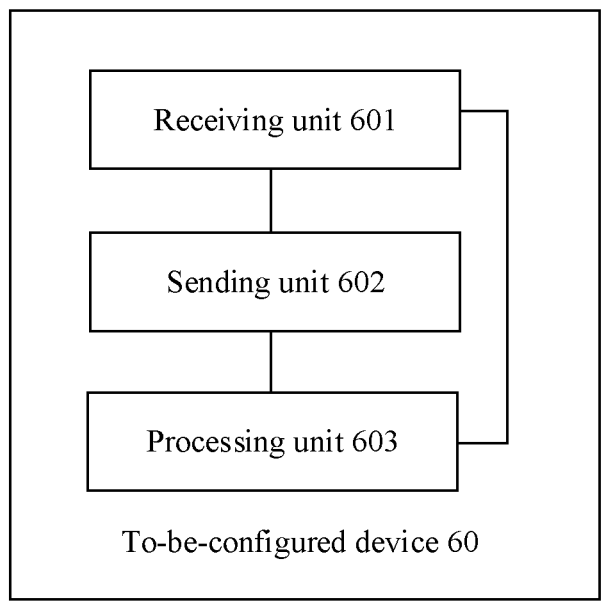
FIG. 6 is a schematic structural diagram of a to-be-configured device according to an embodiment of this application.

FIG. 6 is a schematic structural diagram of a to-be-configured device 60 based on an embodiment of this application. In an example, the to-be-configured device 60 may be configured to perform the steps performed by the to-be-configured device in the device configuration method shown in FIG. 4A and FIG. 4B. The to-be-configured device 60 may include a receiving unit 601, a sending unit 602, and a processing unit 603.

The receiving unit 601 is configured to receive verification information from a network management device, where the verification information is generated by the network management device based on the to-be-configured device, an association relationship exists between the verification information and service configuration information of the to-be-configured device, and the verification information is used for registering the to-be-configured device with the network management device. The sending unit 602 is configured to send a registration request to the network management device, where the registration request includes the verification information. The receiving unit 601 is further configured to receive the service configuration information sent by the network management device. The processing unit 603 is configured to perform configuration based on the service configuration information. For example, with reference to FIG. 4A and FIG. 4B, the receiving unit 601 may be configured to perform a receiving step corresponding to S105 and a receiving step corresponding to S111, the sending unit 602 may be configured to perform S108, and the processing unit 603 may be configured to perform S112.

Optionally, the receiving unit 601 is further configured to receive a URL link sent by an auxiliary configuration device, where a parameter of the URL link includes the verification information, and the URL link is from the network management device. For example, with reference to FIG. 4A and FIG. 4B, the receiving unit 601 may be configured to perform the receiving step corresponding to S105.

Optionally, the parameter of the URL link further includes an address of the network management device and/or a management interface parameter of the to-be-configured device, and the management interface parameter is an address of the to-be-configured device or is used for obtaining the address of the to-be-configured device. The registration request further includes the address of the network management device and the address of the to-be-configured device.

Optionally, the registration request further includes an identifier of the to-be-configured device (for example, an ESN of the to-be-configured device); and the identifier of the to-be-configured device is used by the network management device to perform trustlist verification on the to-be-configured device.

Optionally, the received verification information is encrypted. The receiving unit 601 is further configured to receive a decryption key. The processing unit 603 is further configured to decrypt the received verification information based on the decryption key. For example, with reference to FIG. 4A and FIG. 4B, the receiving unit 601 may be configured to perform a receiving step corresponding to S106.

For explanations of related content, descriptions of beneficial effects, and the like of any to-be-configured device 60 provided above, refer to the foregoing corresponding method embodiments. Details are not described herein again.

In an example, with reference to the communications device shown in FIG. 2, the processing unit 603 may be implemented by using the processor 201 or the processor 207 in FIG. 2. The receiving unit 601 and the sending unit 602 may be implemented by using the communications interface 204 in FIG. 2.

An embodiment of this application further provides a device configuration system. The system may include any network management device 50 provided above and a to-be-configured device configured by the network management device 50. Optionally, the system further includes an auxiliary configuration device that communicates with both the network management device 50 and the to-be-configured device.

An embodiment of this application further provides a device configuration system. The system may include any to-be-configured device 60 provided above and a network management device that configures the to-be-configured device 60. Optionally, the system further includes an auxiliary configuration device that communicates with both the network management device and the to-be-configured device 60.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions based on the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state drive or disk (SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A device configuration method applied to a network management device, wherein the device configuration method comprises:

generating verification information based on a to-be-configured device, wherein the verification information is associated with service configuration information of the to-be-configured device;

sending the verification information to the to-be-configured device;

receiving, in response to sending the verification information, a registration request comprising a first identifier of the to-be-configured device and the verification information from the to-be-configured device;

performing verification on the to-be-configured device based on the verification information and in response to the registration request;

storing a second identifier of at least one site at which the to-be-configured device is located;

establishing an association between the first identifier and the second identifier after successfully performing verification on the to-be-configured device; and sending the service configuration information to the to-be-configured device after performing the verification on the to-be-configured device.

2. The device configuration method of claim 1, wherein sending the verification information to the to-be-configured device comprises sending a uniform resource locator (URL) link to an auxiliary configuration device, wherein a parameter of the URL link comprises the verification information.

3. The device configuration method of claim 1, wherein the verification information has a period of validity.

4. The device configuration method of claim 1, wherein the device configuration method further comprises performing trustlist verification on the to-be-configured device based on the first identifier, and wherein sending the service configuration information to the to-be-configured device comprises sending the service configuration information to the to-be-configured device after the to-be-configured device is successfully verified based on the verification information and the first identifier.

5. The device configuration method of claim 4, wherein establishing the association between the first identifier and the second identifier after successfully performing verification on the to-be-configured device comprises establishing the association between the first identifier and the second identifier after the trustlist verification is successfully performed on the to-be-configured device.

6. The device configuration method of claim 1, further comprising sending the verification information that is encrypted to the to-be-configured device.

7. A device configuration method applied to a to-be-configured device, wherein the method comprises:
  receiving, from an auxiliary configuration device, a uniform resource locator (URL) link originating from a network management device, wherein a parameter of the URL link comprises:
    verification information based on the to-be-configured device and associated with service configuration information of the to-be-configured device; and
    at least one of a first address of the network management device or a management interface parameter of the to-be-configured device, wherein the management interface parameter is a second address of the to-be-configured device or a third address that permits obtaining the second address of the to-be-configured device;
  sending a registration request to the network management device in response to the verification information, wherein the registration request comprises the verification information, the first address of the network management device, and the second address of the to-be-configured device;
  receiving the service configuration information from the network management device in response to the registration request; and
  performing configuration according to the service configuration information.

8. The device configuration method of claim 7, wherein the registration request further comprises an identifier of the to-be-configured device, and wherein the identifier of the to-be-configured device enables the network management device to perform trustlist verification on the to-be-configured device.

9. The device configuration method of claim 7, wherein the verification information is encrypted, and wherein the device configuration method further comprises:
  receiving a decryption key; and
  decrypting the received verification information based on the decryption key.

10. A network management device, comprising:
  a memory configured to store instructions; and
  a processor coupled to the memory, wherein the instructions that when executed by the processor causes the network management device to:
    generate verification information based on a to-be-configured device, wherein the verification information is associated with service configuration information of the to-be-configured device;
    send the verification information to the to-be-configured device;
    receive, in response to sending the verification information, a registration request comprising a first identifier of the to-be-configured device and the verification information from the to-be-configured device;
    perform verification on the to-be-configured device based on the verification information and in response to the registration request;
    store a second identifier of at least one site at which the to-be-configured device is located;
    establish an association between the first identifier and the second identifier after successfully performing verification on the to-be-configured device; and
    send the service configuration information to the to-be-configured device after performing the verification on the to-be-configured device.

11. The network management device of claim 10, wherein the instructions further cause the network management device to send a uniform resource locator (URL) link to an auxiliary configuration device, wherein a parameter of the URL link comprises the verification information.

12. The network management device of claim 10, wherein the verification information has a period of validity.

13. The network management device of claim 10, wherein the instructions further cause the network management device to:
  perform trustlist verification on the to-be-configured device based on the first identifier; and
  send the service configuration information to the to-be-configured device after the to-be-configured device is successfully verified based on the verification information and the first identifier.

14. The network management device of claim 13, wherein the instructions further cause the network management device to establish the association between the first identifier and the second identifier after successfully performing verification on the to-be-configured device by establishing
  an association relationship between the first identifier and the second identifier after the trustlist verification is successfully performed on the to-be-configured device.

15. The network management device of claim 10, wherein the instructions further cause the network management device to send the verification information that is encrypted to the to-be-configured device.

16. A to-be-configured device, comprising:
  a memory configured to store instructions; and
  a processor coupled to the memory, wherein the instructions that when executed by the processor causes the to-be-configured device to:
    receive, from an auxiliary configuration device, a uniform resource locator (URL) link originating from a network management device, wherein a parameter of the URL link comprises:
      verification information based on the to-be-configured device and associated with service configuration information of the to-be-configured device; and
      at least one of a first address of the network management device or a management interface parameter of the to-be-configured device, wherein the management interface parameter is a second address of the to-be-configured device or a third address that permits obtaining the second address of the to-be-configured device;
send a registration request to the network management device in response to receiving the verification information, wherein the registration request comprises the verification information, the first address of the network management device, and the second address of the to-be-configured device;
receive the service configuration information from the network management device in response to the registration request; and
perform configuration according to the service configuration information.

* * * * *